US010924469B2

(12) United States Patent
Fletcher et al.

(10) Patent No.: US 10,924,469 B2
(45) Date of Patent: Feb. 16, 2021

(54) SINGLE SIGN-ON (SSO) FOR INTERNET OF THINGS (IOT) APPLICATIONS

(71) Applicant: VERIZON MEDIA INC., New York, NY (US)

(72) Inventors: George Fletcher, Round Hill, VA (US); Swapnil Patel, Dublin, CA (US); Lovlesh Chhabra, San Ramon, CA (US)

(73) Assignee: VERIZON MEDIA INC., New York, NY (US)

( * ) Notice: Subject to any disclaimer, the term of this patent is extended or adjusted under 35 U.S.C. 154(b) by 240 days.

(21) Appl. No.: 16/193,046

(22) Filed: Nov. 16, 2018

(65) Prior Publication Data

US 2020/0162447 A1 May 21, 2020

(51) Int. Cl.
*H04L 29/06* (2006.01)
*H04W 12/06* (2021.01)

(52) U.S. Cl.
CPC ........ *H04L 63/0815* (2013.01); *H04L 63/102* (2013.01); *H04W 12/06* (2013.01)

(58) Field of Classification Search
CPC ... H04L 63/0815; H04L 63/102; H04W 12/06
See application file for complete search history.

(56) References Cited

U.S. PATENT DOCUMENTS

| | | | | |
|---|---|---|---|---|
| 7,068,992 | B1* | 6/2006 | Massie | H04L 12/5692 455/403 |
| 8,885,466 | B1* | 11/2014 | Seleznyov | H04W 4/50 370/229 |
| 10,356,092 | B2* | 7/2019 | Mattela | H04L 63/0428 |
| 2011/0138380 | A1* | 6/2011 | Sharaga | G06F 21/305 717/178 |
| 2013/0133055 | A1* | 5/2013 | Ali | H04L 63/107 726/7 |
| 2016/0323689 | A1* | 11/2016 | Goluboff | H04L 63/083 |
| 2017/0244555 | A1* | 8/2017 | Beiter | G06K 19/06028 |
| 2018/0084424 | A1* | 3/2018 | Sonasath | H04L 63/0861 |
| 2018/0121921 | A1* | 5/2018 | Woo | G06Q 20/3223 |
| 2018/0234787 | A1* | 8/2018 | Karimli | H04W 4/70 |
| 2019/0013945 | A1* | 1/2019 | Hamlin | H04W 12/06 |

\* cited by examiner

*Primary Examiner* — Vance M Little
(74) *Attorney, Agent, or Firm* — James J. DeCarlo; Greenberg Traurig, LLP (57) ABSTRACT

Systems and methods for authorizing an Internet of Things (IoT) application of an IoT device (such as a smart TV or a set-top box microconsole). Examples can include establishing, by the IoT application, a connection with a mobile application of a mobile device. The connection can be a wireless link that has a maximum range less than or equal to 400 meters (such as a Bluetooth or a near-field communication (NFC) link). Examples can also include sending, by the IoT application, a request to a remote server to return a connector code. The request can include an identification of the wireless link. Examples can also include receiving, by the IoT application, the connector code from the remote server or a second server, and transferring, by the IoT application, the connector code to the mobile application via the wireless link.

20 Claims, 6 Drawing Sheets

SINGLE SIGN-ON (SSO) FOR INTERNET OF THINGS (IOT) APPLICATIONS

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improved systems and methods for single sign-on for applications running on Internet of Things (IoT) devices (hereinafter referred to as "IoT applications").

BACKGROUND

The Internet of things (IoT) is the network of devices, such as home appliances and other items having at least embedded electronics, software, and Internet connectivity. Devices that are part of the Internet of things are often referred to as IoT devices, while applications that run on such devices are often referred to as IoT applications or IoT software. IoT involves extending Internet connectivity beyond computers and mobile devices to any range of traditionally non-Internet-enabled physical devices.

An IoT device often requires that a user is authorized before using the device. And, more often than not the IoT device has a separate sign-on process from other devices the user may frequency use. For example, a smart TV and a smart speaker in the same household and used by the same user can have different sign-on processes and include different authorization information, such as different usernames and passwords. Not only does this create an inconvenience for the user, it can also lead to practices that leave the devices vulnerable to security breaches. For example, users often repeat usernames and passwords across their IoT devices, which practice increases the chances of a security breach.

One example way to overcome the aforesaid problems is to use a single sign-on (SSO) methodology. However, known SSO methodologies are mostly adapted for SSO of mobile applications and mobile devices, and some limitations of some IoT devices may make it impractical to use known standard SSO methodologies alone. For example, many IoT devices do not have a shared security mechanism such as a keychain. Thus problems like this and others described herein exist in this nascent technology.

In general, SSO is used for access control of multiple software systems. Usually the software systems are related. With SSO, conventionally a user logs in with a username and password to access one or more software systems without using different usernames or passwords. Some examples of SSO are known to be implemented using the Lightweight Directory Access Protocol (LDAP), Security Assertion Markup Language (SAML) and OpenID Connect. Also, some versions of SSO can be implemented over IP networks using cookies. Cookies can be used when the applications share a common DNS parent domain. Different mobile applications support different authentication mechanisms. SSO can be adaptable to facilitate storing credentials used for initial authentication, and translate such initial credentials to a diversity of credentials used for different authentication methods.

Some known protocols and standards for access delegation allow for SSO across mobile applications by using session cookies. However, such known techniques have technical problems, such as the risk of a user clearing a cookie from the system hosting the applications. Also, cookies are sometimes avoided altogether when using private browsing by some system browsers of mobile devices. Further, with the use of IoT devices, similar problems can arise as well.

SUMMARY

Described herein are SSO methodologies for IoT devices that leverage aspects of SSO for mobile devices and local wireless communications technologies, such as Bluetooth and Near Field Communication (NFC) technologies. Examples of SSO techniques disclosed herein provide specific technical solutions to at least the aforesaid problems mentioned herein as well as other technical problems not described herein but recognized by those of skill in the art. The SSO methodologies also provide for an enhanced user experience for personalizing IoT based applications for IoT devices. In some examples, local wireless communications technologies are used because of their limited range. By having a limited range, the authentication of IoT devices can be more secure than when using wide area communications technologies. And, sign-on efficiencies with SSO can enhance the user experience with IoT devices, making for easier adoption and thus enhancing security. These benefits can be accomplished by reuse of an authentication the user has already performed on the user's mobile device as well as use of a local wireless communications technology to complete an authentication of an IoT device.

In some embodiments, a user can make a single interaction on a mobile device to approve the migration of an identity from the mobile device to an IoT device. For example, a user can make a single interaction on a smartphone to approve the migration of an identity from the phone to a smart TV or a set-top box microconsole.

In some embodiments, the IoT application of the IoT device can make an initial request to obtain a unique code for authorization. The request can also have the purpose of obtaining a verification URL to be used to complete the authorization process. The unique code and verification URL can then be transferred to a mobile device using a local wireless connection, such as a Bluetooth or NFC connection. And, a mobile application of the mobile device, such as an already authenticated mobile application, can complete the authentication for the IoT application using the unique code. Also, mobile device can use authorized identity tokens as verification.

In some embodiments, the process includes the mobile device showing a consent page to the user regarding the scopes for authentication being requested by the IoT application. Once the user has given consent, the IoT application can be authorized with the identity of the authorized application of the mobile device.

In accordance with one or more embodiments, this disclosure provides computerized methods for SSO for IoT applications using a local wireless technology and an already authenticated mobile application as well as a non-transitory computer-readable storage medium for carrying out technical steps of the SSO. The non-transitory computer-readable storage medium has tangibly stored thereon, or tangibly encoded thereon, computer readable instructions that when executed by one or more devices (e.g., authorization server, client device, IoT device, mobile device, and the like) cause at least one processor to perform a method for a novel and improved SSO using a local wireless technology and an already authenticated mobile application.

In accordance with one or more embodiments, a system is provided that includes one or more computing devices configured to provide functionality in accordance with one or more embodiments of a novel and improved SSO using a local wireless technology and an already authenticated mobile application.

In accordance with one or more embodiments, functionality is embodied in steps of a method performed by at least one computing device. In accordance with one or more embodiments, program code (or program logic) executed by processor(s) of a computing device to implement functionality in accordance with one or more embodiments described herein is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium can include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine-readable media, for example. A network may include the Internet, one or more local area networks (LANs), one or more wide area networks (WANs), wire☐line type connections, wireless type connections, cellular or any combination thereof. Likewise, sub☐networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ standalone adhoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, an NFC device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

For purposes of this disclosure, a mobile device is or includes a client device that is small enough to be held and operated by one or two hands of a person. In some examples, a mobile device has a touchscreen interface with digitally derived buttons and keyboard or physical buttons along with a physical keyboard or keypad. A mobile device can connect to the Internet and interconnect with other devices such as an Internet of Things (IoT) device or another type of network connected device via Wi-Fi, Bluetooth, cellular networks or near field communication (NFC). A camera and other types of sensors, as well as digital media players and parts of a Global Positioning System (GPS) can be included in a mobile device. Power can be provided to a mobile device by a battery or other wireless power source such a solar power source. A mobile device can run a mobile operating system that allows third-party mobile applications such as applications from a same vendor to be installed and run on the mobile device.

In some embodiments, the mobile applications described herein can include one or more advertisements. For purposes of this disclosure, an advertisement should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item includes content relaying promotional content provided by a network associated party.

Figure 1:
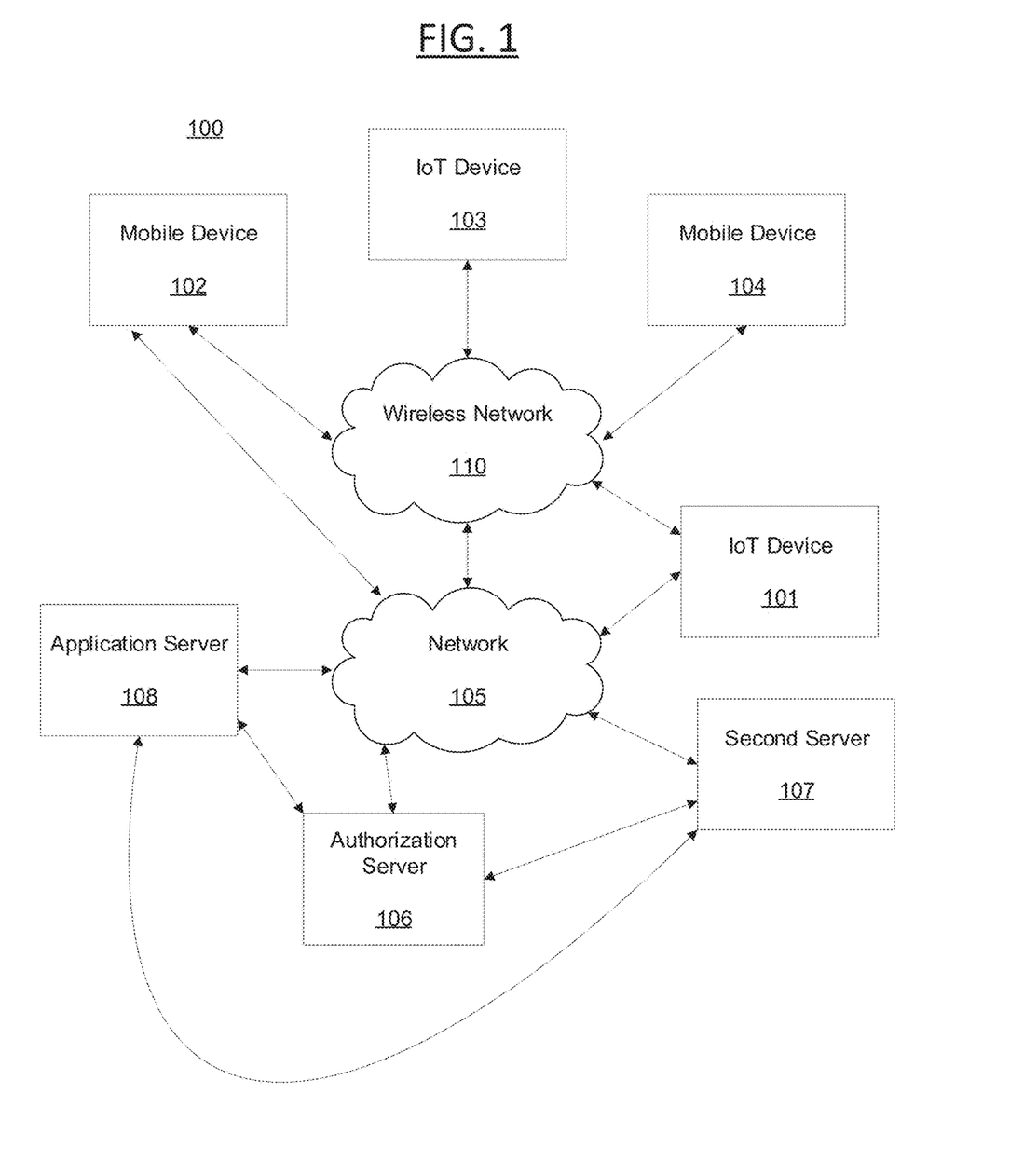
FIG. 1 is a schematic diagram illustrating an example of a network within which systems and methods disclosed herein can be implemented according to some embodiments of the present disclosure.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110 (which can be a local wireless network having a maximum range less than or equal to 400 meters—such as a Bluetooth network or a NFC network), mobile devices (e.g., handheld client devices) 102 and 104, and IoT devices 101 and 103 (e.g., a smart TV, a set-top box microconsole, smart refrigerator, etc.). FIG. 1 additionally includes a variety of servers, such as an authorization server 106, a second server 107 (which could be secondary authorization server solely or combined with another type of server such as an application server or a content server), and an application (or "App") server 108. Each of the servers can be considered a remote server with respect to the IoT devices and the mobile devices illustrated in FIG. 1.

Figure 3:
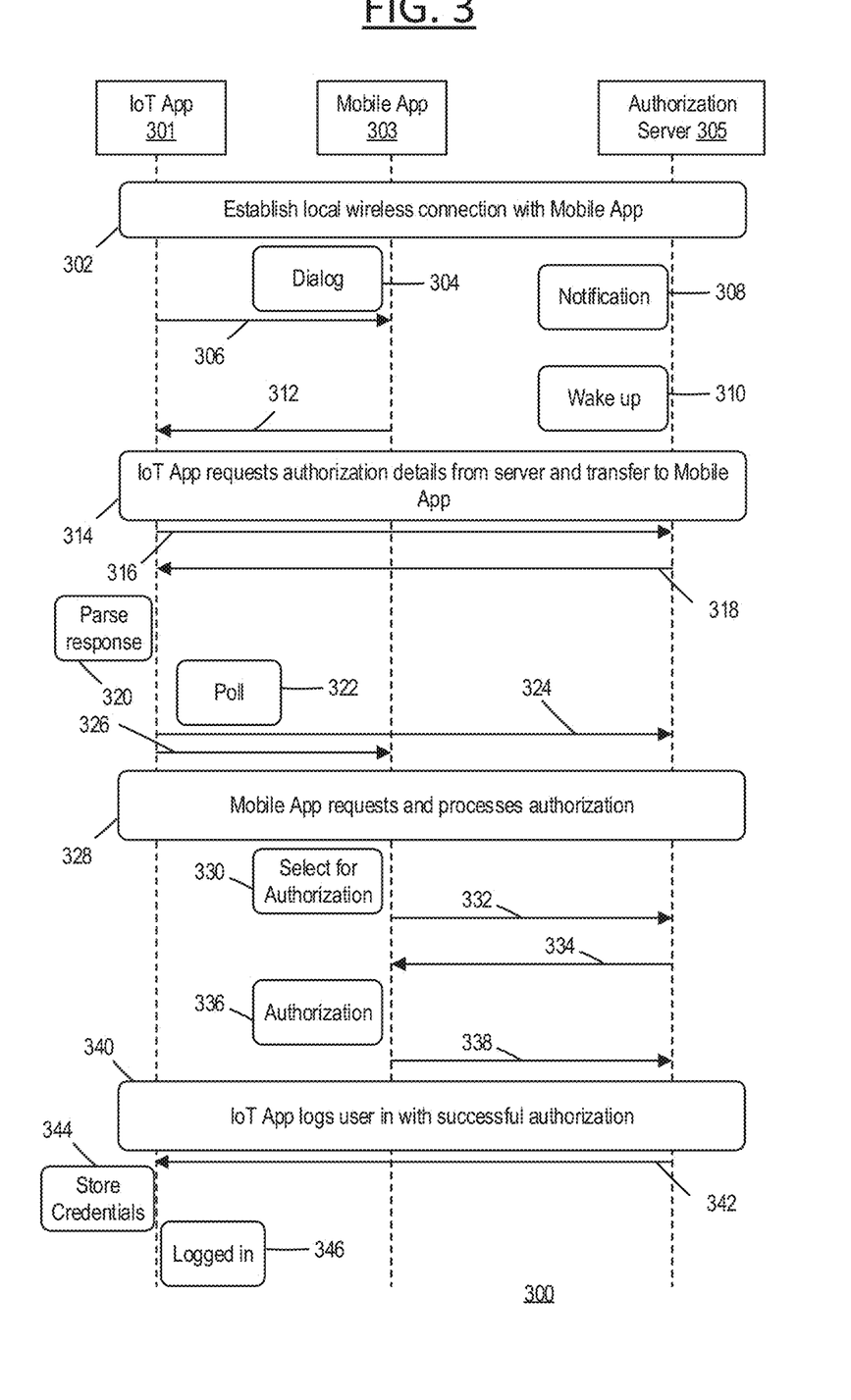
FIG. 3 is a flowchart illustrating operations that can be performed by at least an IoT application, a mobile application, and an authorization server in accordance with some embodiments of the present disclosure.
Figure 4:
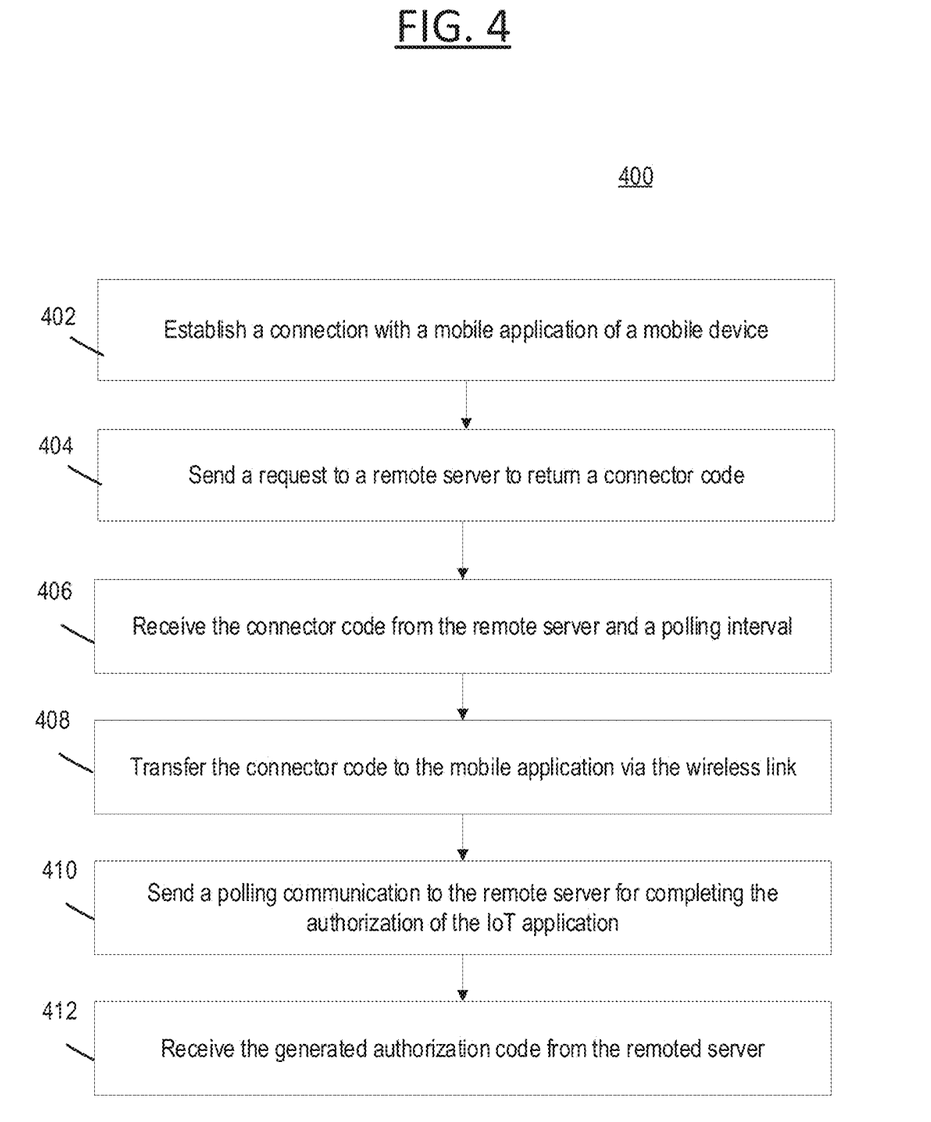
FIG. 4 is a flowchart illustrating operations that can be performed by at least an IoT application in accordance with some embodiments of the present disclosure.

Each of the IoT devices 101 and 103 can include a device that includes a configuration to perform at least some of the operations of process 400 of FIG. 4. Each of the mobile devices 102 and 104 can include a device that includes a configuration to perform at least some of the operations of process 500 of FIG. 5. Also, each of the mobile devices 102 and 104 and the IoT devices 101 and 103 can include a device that includes a configuration to perform at least some of the operations of process 300 performed by the mobile application 303 and the IoT application 301 in FIG. 3.

Figure 6:
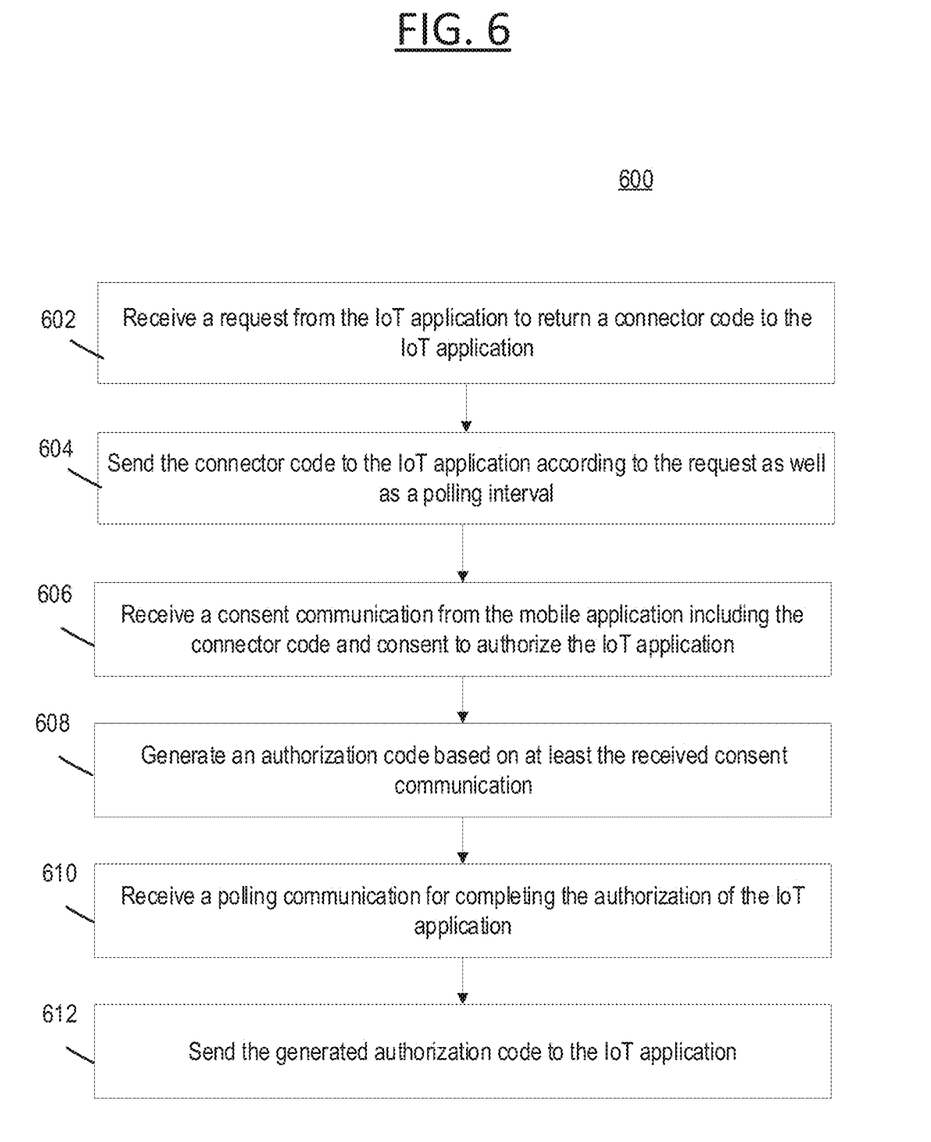
FIG. 6 is a flowchart illustrating operations that can be performed by at least an authorization server or the like in accordance with some embodiments of the present disclosure.

The authorization server 106 and/or the second server 107 can include a device that includes a configuration to perform at least some of the operations of process 600 of FIG. 6. Also, the authorization server 106 and/or the second server 107 can include a device that includes a configuration to perform at least some of the operations of process 300 performed by the authorization server 305 in FIG. 3.

An embodiment of IoT devices 101 and 103 and the mobile devices 102 and 104 is described in more detail below.

Generally, the IoT devices 101 and 103 can include or be any device with embedded electronics, software, actuators, sensors, and interfaces to networks such as the Internet. For example, the IoT devices 101 and 103 can include or be a vehicle or a home appliance with embedded electronics, software, actuators, sensors, and interfaces to networks such as the Internet.

Generally, mobile devices 102 and 104 may include virtually any portable computing device capable of receiving and sending a message over a network, such as network 105, wireless network 110, or the like. Mobile devices 102 and 104 may also be described generally as client devices that are configured to be portable. Thus, mobile devices 102 and 104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102 and 104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 and 104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 and 104 may uniquely identify themselves through any of a variety of mechanisms, including a phone number, Mobile Identification Number (MIN), an electronic serial number (ESN), or another mobile device identifier.

In some embodiments, mobile devices 102 and 104 may also communicate with non-mobile client devices, such as IoT devices 101 and 103, or the like. In one embodiment, such communications may include sending and/or receiving messages, searching for, viewing and/or sharing photographs, audio clips, video clips, or any of a variety of other forms of communications. IoT devices 101 and 103 can include virtually any non-mobile computing device capable of communicating over a network to send and receive information. The set of such devices may also include devices that typically connect using a wired or wireless communications medium such as personal computers, multiprocessor systems, microprocessor-based or programmable consumer electronics, network PCs, or the like. The IoT devices 101 and 103 and the set of devices overall may also have differing capabilities for displaying navigable views of information from that of the mobile devices.

In general, devices 101-104 computing device may be capable of sending or receiving signals, such as via a wired or wireless network, or may be capable of processing or storing signals, such as in memory as physical memory states, and may, therefore, operate as a server.

Wireless network 110 is configured to couple IoT devices 101 and 103 and mobile devices 102 and 104 and its components with network 105. Wireless network 110 may include any of a variety of wireless sub-networks that may further overlay stand-alone ad-hoc networks, and the like, to provide an infrastructure-oriented connection for IoT devices 101 and 103 and mobile devices 102 and 104. Such sub-networks may include mesh networks, Wireless LAN (WLAN) networks, cellular networks, and the like. In some embodiments, the wireless network 110 is configured to support a wireless link that has a maximum range less than or equal to 400 meters. In some embodiments, the wireless network 110 is configured to support a wireless link that has a maximum range less than or equal to 100 meters. In some embodiments, the wireless network 110 supports a Bluetooth link, thus the network is a Bluetooth network. In some embodiments, the wireless network 110 supports a NFC link, thus the network is a NFC network. In some embodiments, the wireless network 110 is one or more of a network with a maximum range less than or equal to 400 meters, a network with a maximum range less than or equal to 100 meters, a Bluetooth network, or a NFC network.

Network 105 is configured to couple authorization server 106, application server 108, or the like, with other computing devices, including, IoT device 101 and mobile device 102, and through wireless network 110 to IoT device 103 and mobile device 104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refer to a set of technologies that permit interoperable communication across multiple devices or platforms, such as IoT devices, cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 can include a content distribution network(s). A "content delivery network" or "content distribution network" (CDN) generally refers to a distributed content delivery system that includes a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

As mentioned herein, the authorization server 106 and/or the second server 107 can include a device that includes a configuration to perform at least some of the operations of process 600. Also, the authorization server 106 and/or the second server 107 can include a device that includes a configuration to perform at least some of the operations of process 300 performed by the authorization server 305.

The application server 108 and/or the second server 107 can include a device that includes a configuration to provide content such as interactive content via a network to another device. Such server(s) may, for example, host a site, service or an associated application, such as, an email platform (e.g., Yahoo! ® Mail), a social networking site, a photo sharing site/service (e.g., Tumblr®), a search platform or site, or a personal user site (such as a blog, vlog, online dating site, and the like) and the like. Such server(s) may also host a variety of other sites, including, but not limited to business sites, educational sites, dictionary sites, encyclopedia sites, wikis, financial sites, government sites, and the like. Devices that may operate as such server(s) include personal computers desktop computers, multiprocessor systems, microprocessor-based or programmable consumer electronics, network PCs, servers, and the like.

The application server 108 and/or the second server 107 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content may include videos, text, audio, images, or the like, which may be processed in the form of physical signals, such as electrical signals, for example, or may be stored in memory, as physical states, for example.

Also, the application server 108 and/or the second server 107 can include an ad server such as a server that stores online advertisements for presentation to users. "Ad serving" provided by an ad server refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high-quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available. Such functionality can be provided by at least one of the servers 107 and 108.

Servers 106, 107, and 108 can be capable of sending or receiving signals, such as via a wired or wireless network, or can be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 107, and/or 108. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a mail or messaging application (e.g., Yahoo!® Mail, Yahoo!® Messenger), a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), and the like, can be hosted by the application server 108 (or a second server 107 such as one include a content server, message server and the like). Thus, the application server 108 can store various types of applications and application related information including application data and user profile information (e.g., identifying and behavioral information associated with a user). It should also be understood that server 107 can also store various types of data related to the content and services provided by server 107 in an associated database. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 107, and 108.

Moreover, although FIG. 1 illustrates servers 106, 107, and 108 as single computing devices, respectively, the disclosure is not so limited. For example, one or more functions of servers 106, 107, and 108 may be distributed across one or more distinct computing devices. Moreover, in one embodiment, servers 106, 107, and/or 108 may be integrated into a single computing device, without departing from the scope of the present disclosure.

Figure 2:
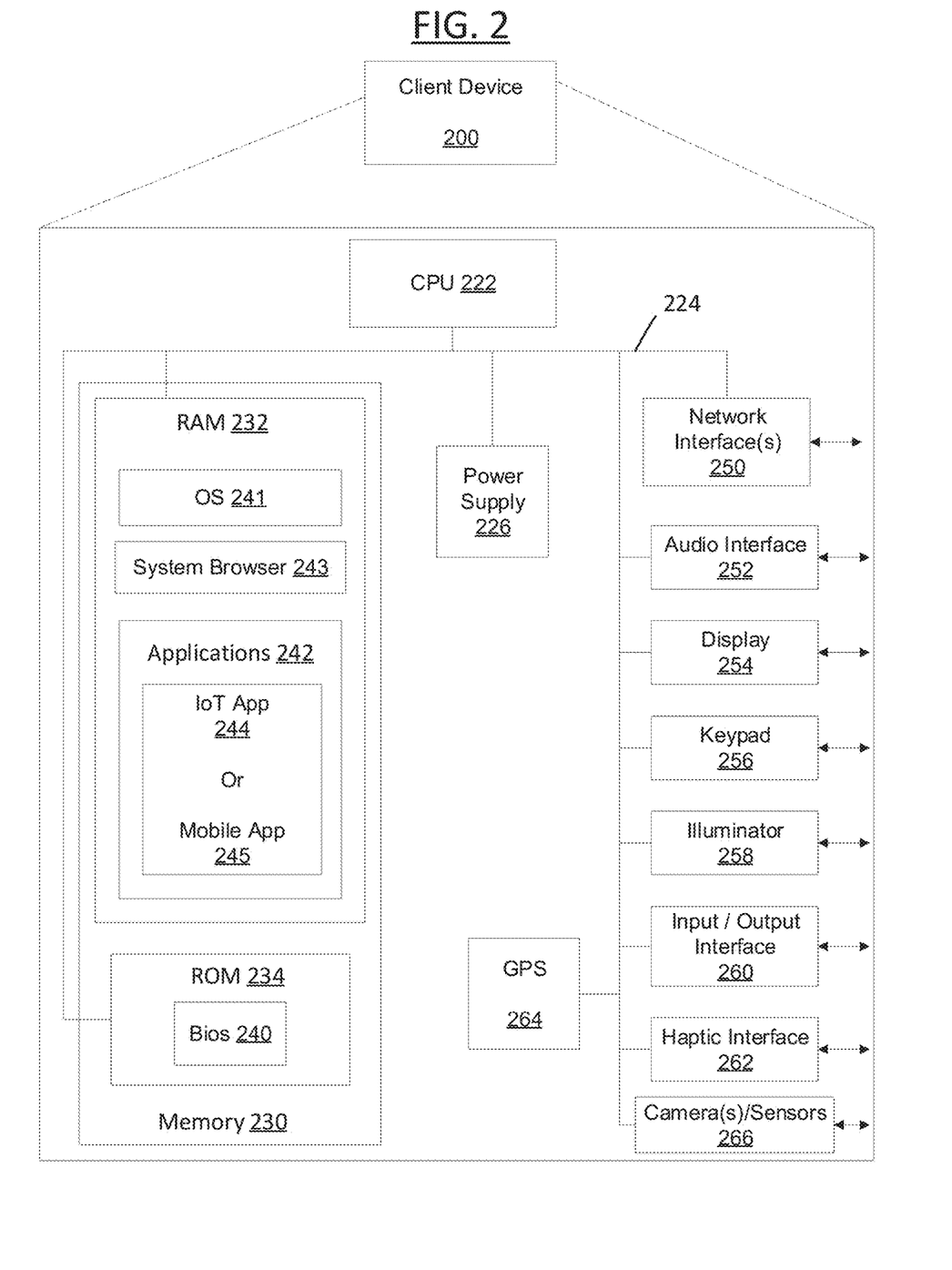
FIG. 2 depicts is a schematic diagram illustrating an example of a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing some aspects the present disclosure. Client device 200 may represent, for example, client and mobile devices discussed above in relation to FIG. 1 as well as IoT devices as discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 can include any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also includes input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 in RAM 232 for controlling the operation of client device 200. It will be appreciated that this component may include a general-purpose operating system such as a version of UNIX, or LINUX™, or a specialized client communication operating system such as Windows Client™ or the Symbian® operating system. The operating system may include, or interface with a Java virtual machine module that enables control of hardware components and/or operating system operations via Java application programs. The mass memory also stores a system browser in RAM 232 for controlling operations of a system browser 243 and applications 242, such as controlling operations of an IoT application 244 or a mobile application 245.

Memory 230 further includes one or more data stores, which can be utilized by client device 200 to store, among other things, the system browser 243, the applications 242 (such as IoT application 244 or mobile application 245) and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242, such as the IoT application 244 or the mobile application 245, may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Application 244 or 245 may include a search client that is configured to send, to receive, and/or to otherwise process a search query and/or search result using any known or to be known communication protocols. It should be clear that multiple search clients may be employed by application 244 or 245. For example, one search client may be configured to enter a search query message, where another search client manages search results, and yet another search client is configured to manage serving digital content (e.g., advertisements) or other forms of digital data associated with, but not limited to, IMs, emails, and other types of known messages, or the like. Each search client may be implemented by a separate one of either application 244 or 245.

Having described components of the architecture employed within the disclosed systems and methods, the components' operations with respect to the disclosed systems and methods will now be described below with reference to FIGS. 3-6.

Turning to FIG. 3, process 300 details steps performed in accordance with some embodiments of the present disclosure for allowing an IoT application 301 (e.g., the IoT application 244 illustrated in FIG. 2) to be authenticated through a mobile application 303 (e.g., the mobile application 245 illustrated in FIG. 2) and an authorization server 305 (e.g., the authorization server 106 illustrated in FIG. 1). In some embodiments, the IoT application 301 can include an IoT device operating system application (such as an operating system application of a smart TV or set-top box microconsole) and the mobile application 303 can include a mobile device operating system application.

Step 302 of process 300, includes sub-steps 304-312 and the IoT application 301 establishing a local wireless connection (such as a Bluetooth connection or an NFC connection) with a logged in session of the mobile application 303. The IoT application 301 running on an IoT device (such as one of IoT devices 101 and 103) and the mobile application 303 running on a mobile device (such as one of mobile devices 102 and 104). Step 304, includes the mobile application 303 displaying a user interface requesting a user of the application to turn on a wireless technology of the mobile device to communicate via the local wireless connection. Step 304 also includes the mobile application 303 displaying a user interface requesting the user to move within a certain distance of the IoT device. Step 306, includes the IoT application 301 requesting the wireless connection with the mobile application 303. Step 308, includes the mobile application 301 notifying the authorization server 305 of the wireless connection request in the foreground or the background of the mobile application 301. Step 310, includes the mobile application being made an active application on the mobile device if notification is provided in the background. Step 312, includes, the IoT application 301 and the mobile application 303 completing the wireless connection handshake and the mobile application creating the wireless link with the IoT application or vice versa.

Step 314, includes sub-steps 316-326 and the IoT application 301 requesting authorization details from the authorization server 105 using an authorization framework (such as an authorization framework that allows applications to obtain limited access to user accounts on an HTTP service). Step 314, also includes the IoT application 301 transferring the details to the mobile application 303 once they are received. Step 316, includes the IoT application requesting authorization from the authorization server 305. The request including a client identification and a notice of the wireless connection. Step 318, includes the authorization server 305 returning the authorization response to the IoT application 301. The authorization response including a connector code (such as a unique user code). The response can also include a verification URL and/or a TTL. Step 320, includes the IoT application 301 parsing the authorization response. Step 322, includes the IoT application 301 polling the authorization server 305 for a user authorization response. The polling can have exponential back-off and a timeout strategy. Step 324, includes the IoT application 301 sending a poll request for user authorization to the authorization server 305. Step 326, includes the IoT application 301 transferring authorization details to the mobile application 303 over the wireless connection to start authorization of the IoT application via the mobile application. The authorization details can include the connector code and the verification URL.

Step 328, includes sub-steps 330-338 and the mobile application 303 requesting and processing authorization for the IoT application 301. Step 330, includes the mobile application 303 selecting a user for authorization in the case of multiple users on the mobile device or defaults to selecting the current active user on the mobile device. Step 332, includes the mobile application 303 sending an authorization request for the IoT application 301 to the authorization server 305, such as to the verification URL of the authorization server. The authorization URL can include a login function call along with some login details and the connector code. Step 334, includes the authorization server 305 sending a response to the request to the mobile application 303. The response to the request of Step 332 can include a URI to render for retrieving user authorization. Step 336, includes the mobile application 303 opening a user authorization screen on the mobile device. The screen can include a dialog to select yes or no to the authorization. A selection for authorization can include the account key of the account being authorized. Step 338, includes the mobile device 303 posting the user authorization to the authorization server 305. For example, step 338 can include the mobile application 303 posting the user authorization to the verification URL of the server 305.

Step 340, includes sub-steps 342-346 and the IoT application 301 logging the user in with a successful authorization. Step 342 includes the authorization server 305 finalizing polling with the IoT application 301 for user authorization. This finalization occurs with the authorization server 305 sending the IoT application 301 authorization tokens of the authorization framework for the IoT application client identification (such as access, refresh, and identification tokens). Step 344, includes the IoT application 301 storing the user credentials sent from the authorization server 305. Subsequently, at step 346, the user is logged into the IoT application 301. And, the SSO process is complete.

In some embodiments, the IoT application is a smart TV application or a set-top box application that establishes a Bluetooth or NFC connection with a user's mobile device. In such examples, the user can be required to be near the TV or the set-top box for the connection to activate. The IoT application then can instruct the user to move near the TV or the box and start the corresponding application on the user's mobile device. The TV can then inform the user that the IoT and mobile devices are connected when the mobile device is within range of the TV or set-top box according to the wireless technology used. In such embodiments, IoT application, being a TV or set-top box application, requests authorization. Then, the TV or set-top box application transfers received authorization parameters to the mobile device via the Bluetooth or NFC link. The TV or box application can use the existing authentication framework or standard to request an authorization with the addition of a hint to the authorization server of the framework that the user will be using Bluetooth or NFC to complete the authentication. The authorization response provides the TV or set-top box application with some data that can be transferred to the mobile device via Bluetooth or NFC as well as a polling interval used to poll the authorization server for the completion of the authorization event. Then, via the Bluetooth or NFC connection, the TV or set-top box application can transfer a unique code (e.g., user_code of the OAuth2 framework) representing the authorization request as well as a URL (e.g., verification url) for completing the authorization flow via the mobile device. At this point the TV or set-top box application will be polling the framework's authorization server to obtain the frameworks authorization tokens after the user completes the flow on the mobile device.

In such embodiments, the mobile device can request the user to select an identity already authenticated on the device. The mobile application can look into the device's shared secure storage (e.g., keychain on the mobile operating system) to determine the identities that are already authenticated on the mobile device. The mobile application then can request the user to select one of the existing identities to be used with the TV or set-top box application. The user can choose to login with a different identity or use the identity already logged in as a default. Then, the mobile device can present a consent screen for the selected identity. Once the user has selected an existing user already authenticated on the mobile device and consented to using the corresponding account, the mobile application can send the connector code and a desired language specification to the verification URL at the authorization server. If required, the response will contain consent data that will be shown to the user to obtain their consent for the TV or the set-top box application to access their personal data. Then, the mobile device displays another consent page and asks the user to consent to the requested TV or set-top box application scopes. The mobile application can display any required consent data to the user and allow the user to consent to the access requested by the TV or set-top box application.

Also, in such embodiments, the mobile device can post consent to the authorization server. The mobile application contacts the authorization server via the verification URL informing the framework's authorization server that the user has consented to the requested access of the IoT application. At this point the user interactions with the mobile device are complete.

While the user is authorizing via their mobile device, the IoT application is polling the authorization server at the provided interval rate. During the time the user is interacting with the mobile app, the TV or set-top box application is polling the authorization server to obtain the completed authorization in the form of the authorization framework's tokens. When the authorization flow is finalized through the mobile application, on the next poll by the IoT application, the authorization server can return to the IoT application the framework's tokens (e.g., access token, refresh token, id token) along with some additional metadata. At this point, the IoT application has an identified user and the tokens necessary to provide personalized content.

Turning to FIG. 4, process 400 details steps performed by an IoT application of an IoT device in accordance with some embodiments of the present disclosure for allowing an IoT application to be authenticated through a mobile application and an authorization server. The process 400 is especially useful when the applications are issued by a same vendor. Also, the process 400 can include some of the steps illustrated in FIG. 3. The IoT device can be any type of IoT device such as a smart TV or a set-top box microconsole.

Process 400 begins with step 402, which includes the IoT application establishing a connection with a mobile application of a mobile device. In some example embodiments, the connection is a wireless link that has a maximum range less than or equal to 400 meters. In some example embodiments, the connection is a wireless link that has a maximum range less than or equal to 100 meters. In some embodiments, the connection is either a Bluetooth link or an NFC link.

In step 404, the IoT application sends a request to a remote server to return a connector code. The request to return the connector code can include an identification of a wireless link (such as an identification that the IoT application will be communicating with a mobile application of a mobile device via a wireless link).

In step 406, the IoT application receives the connector code from the remote server and a polling interval. This can include receiving, by the IoT application, an interval from the remote server used to poll the remote server for completing the authorization of the IoT application. In some embodiments, the remote server returns the connector code to the IoT application according to the request.

In step 408, the IoT application transfers the connector code to the mobile application via the wireless link.

In some example embodiments, the mobile application sends a consent communication to the remote server that includes the transferred connector code and consent to authorize the IoT application. Also, in some embodiments, the remote server generates an authorization code to send to the IoT application based on at least the consent communication from the mobile application.

The consent to authorize the IoT application can include account information associated with a user account, and the generated authorization code can include at least part of the account information so that the authorization of the IoT application is for the user account.

The mobile device can generate the consent to authorize the IoT application in response to a selection of a user account to associate with the consent. Also, the mobile device can generate the consent to authorize the IoT application in response to a selection of a scope of use of the IoT application to associate with the consent.

The user account can be an authorized user account for the mobile application. In that the account is authorized by the authorization server or at least the corresponding authorization framework.

In step 410, the IoT application sends a polling communication to the remote server for completing the authorization of the IoT application. This can include sending, by the IoT application, the polling communication for completing the authorization of the IoT application according to the received interval.

In step 412, the IoT application receives the generated authorization code from the remoted server after the remote serve has received the polling communication.

Figure 5:
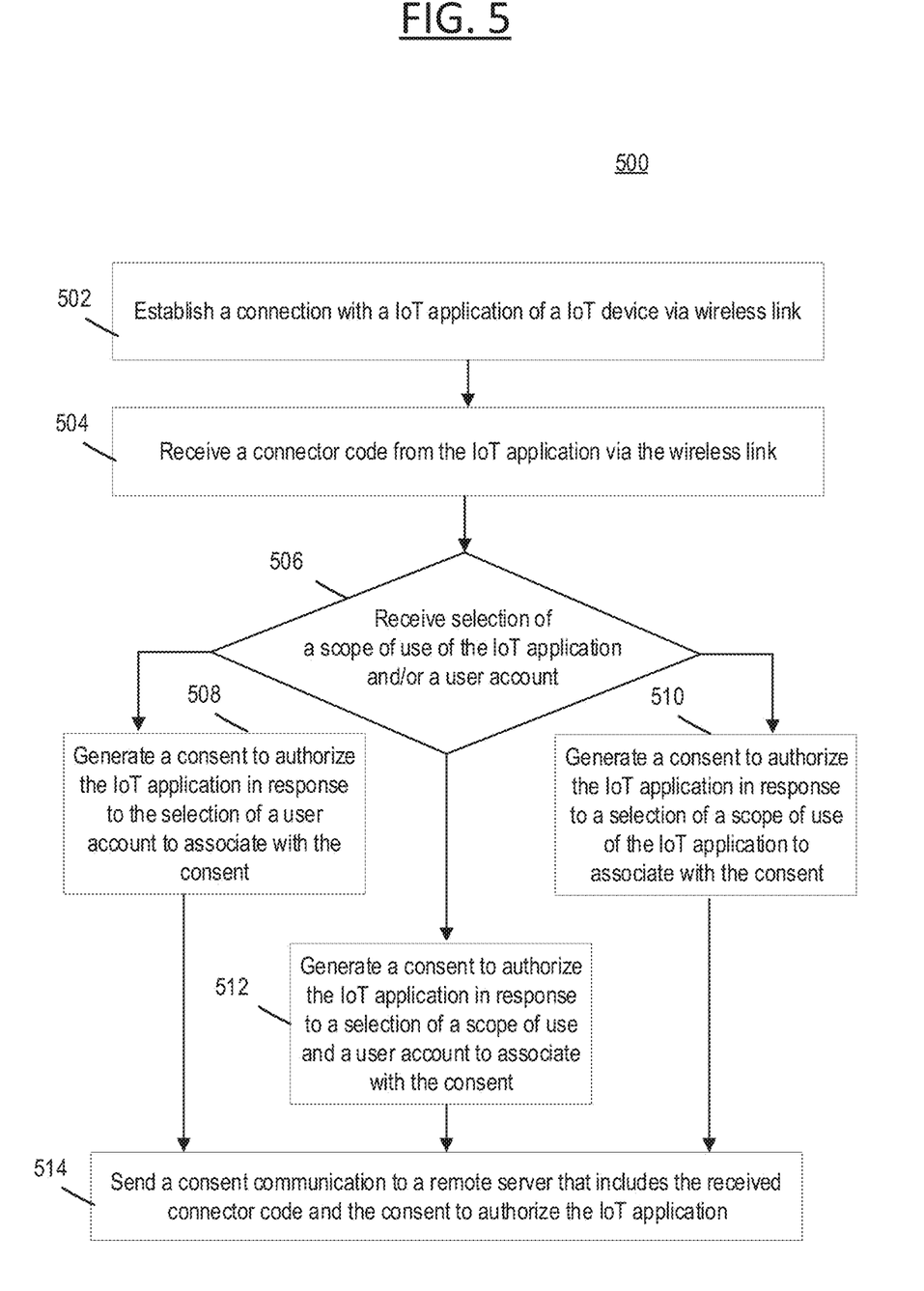
FIG. 5 is a flowchart illustrating operations that can be performed by at least a mobile application in accordance with some embodiments of the present disclosure.

Turning to FIG. 5, process 500 details steps performed by a mobile application of a mobile device in accordance with some embodiments of the present disclosure for allowing an IoT application to be authenticated through the mobile application and an authorization server. The process 500 is especially useful when the applications are issued by a same vendor. Also, the process 500 can include some of the steps illustrated in FIG. 3. The mobile device can be any type of mobile device such as a smart phone or a smartwatch.

Process 500 begins with step 502, which includes the mobile application establishing a connection with an IoT application of an IoT device. In step 504, the mobile application receives a connector code from the IoT application via the connection. In some example embodiments, the connection is a wireless link that has a maximum range less than or equal to 400 meters. In some example embodiments, the connection is a wireless link that has a maximum range less than or equal to 100 meters. In some embodiments, the connection is either a Bluetooth link or an NFC link.

In step 506, the mobile application receives a selection of a scope of use of the IoT application and/or a selection of a user account. In step 508, the mobile application generates a consent to authorize the IoT application in response to the selection of a user account to associate with the consent. In step 510, the mobile application generates a consent to authorize the IoT application in response to a selection of a scope of use of the IoT application to associate with the consent. In step 512, the mobile application generates a consent to authorize the IoT application in response to a selection of a scope of use and a user account to associate with the consent. In step 514, the mobile application sends a consent communication to a remote server that includes the received connector code and the consent to authorize the IoT application.

Turning to FIG. 6, process 600 details steps performed by an authorization server in accordance with some embodiments of the present disclosure for allowing an IoT application to be authenticated through a mobile application and the authorization server. The process 600 is especially useful when the applications are issued by a same vendor. Also, the process 600 can include some of the steps illustrated in FIG. 3. The authorization server can be any type of computing system such as the server 106 illustrated in FIG. 1.

Process 600 begins with step 602, which includes the authorization server receiving a request from the IoT application to return a connector code to the IoT application. The request can include an identification of a wireless link (such as an identification that the IoT application will be communicating with a mobile application of a mobile device via a wireless link). In some example embodiments, the wireless link has a maximum range less than or equal to 400 meters. In some example embodiments, the wireless link has a maximum range less than or equal to 100 meters. In some embodiments, the wireless link is a Bluetooth link or an NFC link.

In step 604, the authorization server sends the connector code to the IoT application according to the request as well as sends a polling interval. In such embodiments, the IoT application can send the connector code to the mobile application via the wireless link. In such embodiments, the polling interval can poll the server for completing the authorization of the IoT application.

In step 606, the authorization server receives a consent communication from the mobile application including the connector code and consent to authorize the IoT application. The mobile application can send the consent communication to the remote server at least after receiving the connector code from the IoT application.

In step 608, the authorization server generates an authorization code based on at least the received consent communication.

In step 610, the authorization server receives a polling communication for completing the authorization of the IoT application. The polling communication can be sent from the IoT application according to the sent interval.

In step 612, the authorization server sends the generated authorization code to the IoT application after the authorization serve has received the polling communication from the IoT application.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method, comprising:
    establishing, by an Internet of Things (IoT) application of an IoT device, a connection with a mobile application of a mobile device;
    sending, by the IoT application, a request to a remote server to return a connector code, the request comprising an identification of the connection;
    receiving, by the IoT application, the connector code from the remote server or a second server;
    receiving, by the IoT application and from the remote server, an interval for use in polling the remote server in connection with completion of an authorization of the IoT application;
    transferring, by the IoT application, the connector code to the mobile application via the connection,
        wherein the mobile application sends a consent communication to the remote server that comprises the transferred connector code and a consent to authorize the IoT application, and
        wherein the remote server generates an authorization code to send to the IoT application based on at least the consent communication from the mobile application; and
    receiving, by the IoT application, the generated authorization code from the remote server.

2. The method of claim 1, further comprising:
    sending, by the IoT application, a polling communication for completing the authorization of the IoT application according to the received interval; and
    receiving, by the IoT application, the generated authorization code from the remote server after the remote server has received the polling communication.

3. The method of claim 1, wherein the consent to authorize the IoT application comprises account information associated with a user account.

4. The method of claim 3, wherein the user account is an authorized user account for the mobile application.

5. The method of claim 1, wherein the mobile device generates the consent to authorize the IoT application in response to a selection of a user account to associate with the consent.

6. The method of claim 1, wherein the mobile device generates the consent to authorize the IoT application in response to a selection of a scope of use of the IoT application to associate with the consent.

7. The method of claim 1, wherein the connection is a wireless link that has a maximum range less than or equal to 400 meters.

8. The method of claim 1, wherein the connection is a wireless link that has a maximum range less than or equal to 100 meters.

9. The method of claim 1, wherein the connection is a Bluetooth link.

10. The method of claim 1, wherein the connection is a near-field communication (NFC) link.

11. The method of claim 1, wherein the IoT device is a smart TV.

12. The method of claim 1, wherein the IoT device is a set-top box microconsole.

13. A non-transitory computer-readable storage medium tangibly encoded with computer-executable instructions, that when executed by a processor associated with a computing device, performs a method, the method comprising:
    establishing, by an Internet of Things (IoT) application of an IoT device, a connection with a mobile application of a mobile device;
    sending, by the IoT application, a request to a remote server to return a connector code, the request comprising an identification of the connection;
    receiving, by the IoT application, the connector code from the remote server or a second server;
    receiving, by the IoT application and from the remote server, an interval for use in polling the remote server in connection with completion of an authorization of the IoT application;
    transferring, by the IoT application, the connector code to the mobile application via the connection,
        wherein the mobile application sends a consent communication to the remote server that comprises the transferred connector code and a consent to authorize the IoT application, and
        wherein the remote server generates an authorization code to send to the IoT application based on at least the consent communication from the mobile application; and
    receiving, by the IoT application, the generated authorization code from the remote server.

14. The non-transitory computer-readable storage medium of claim 13, wherein the method further comprises:
    sending, by the IoT application, a polling communication for completing the authorization of the IoT application according to the received interval; and receiving, by the IoT application, the generated authorization code from the remote server after the remote server has received the polling communication.

15. The non-transitory computer-readable storage medium of claim 13, wherein the consent to authorize the IoT application comprises account information associated with a user account.

16. The non-transitory computer-readable storage medium of claim 15, wherein the user account is an authorized user account for the mobile application.

17. The non-transitory computer-readable storage medium of claim 13, wherein the mobile device generates the consent to authorize the IoT application in response to a selection of a user account to associate with the consent.

18. The non-transitory computer-readable storage medium of claim 13, wherein the mobile device generates the consent to authorize the IoT application in response to a selection of a scope of use of the IoT application to associate with the consent.

19. A computing device, comprising: a processor; and a non-transitory computer-readable storage medium for tangibly storing thereon program logic for execution by the processor, the program logic comprising:
   executable logic for establishing, by an Internet of Things (IoT) application of an IoT device, a connection with a mobile application of a mobile device;
   executable logic for sending, by the IoT application, a request to a remote server to return a connector code, the request comprising an identification of the connection;
   executable logic for receiving, by the IoT application, the connector code from the remote server or a second server;
   executable logic for receiving, by the IoT application and from the remote server, an interval for use in polling the remote server in connection with completion of an authorization of the IoT application;
   executable logic for transferring, by the IoT application, the connector code to the mobile application via the connection,
      wherein the mobile application sends a consent communication to the remote server that comprises the transferred connector code and a consent to authorize the IoT application, and
      wherein the remote server generates an authorization code to send to the IoT application based on at least the consent communication from the mobile application; and
   executable logic for receiving, by the IoT application, the generated authorization code from the remote server.

20. The computing device of claim 19, wherein the program logic further comprises:
   executable logic for sending, by the IoT application, a polling communication for completing the authorization of the IoT application according to the received interval; and
   executable logic for receiving, by the IoT application, the generated authorization code from the remote server after the remote server has received the polling communication.

* * * * *